Dec. 3, 1935.   I. OFFERDAHL   2,023,028
JET PROPELLED FLOAT FOR FIRE NOZZLES
Filed March 20, 1933
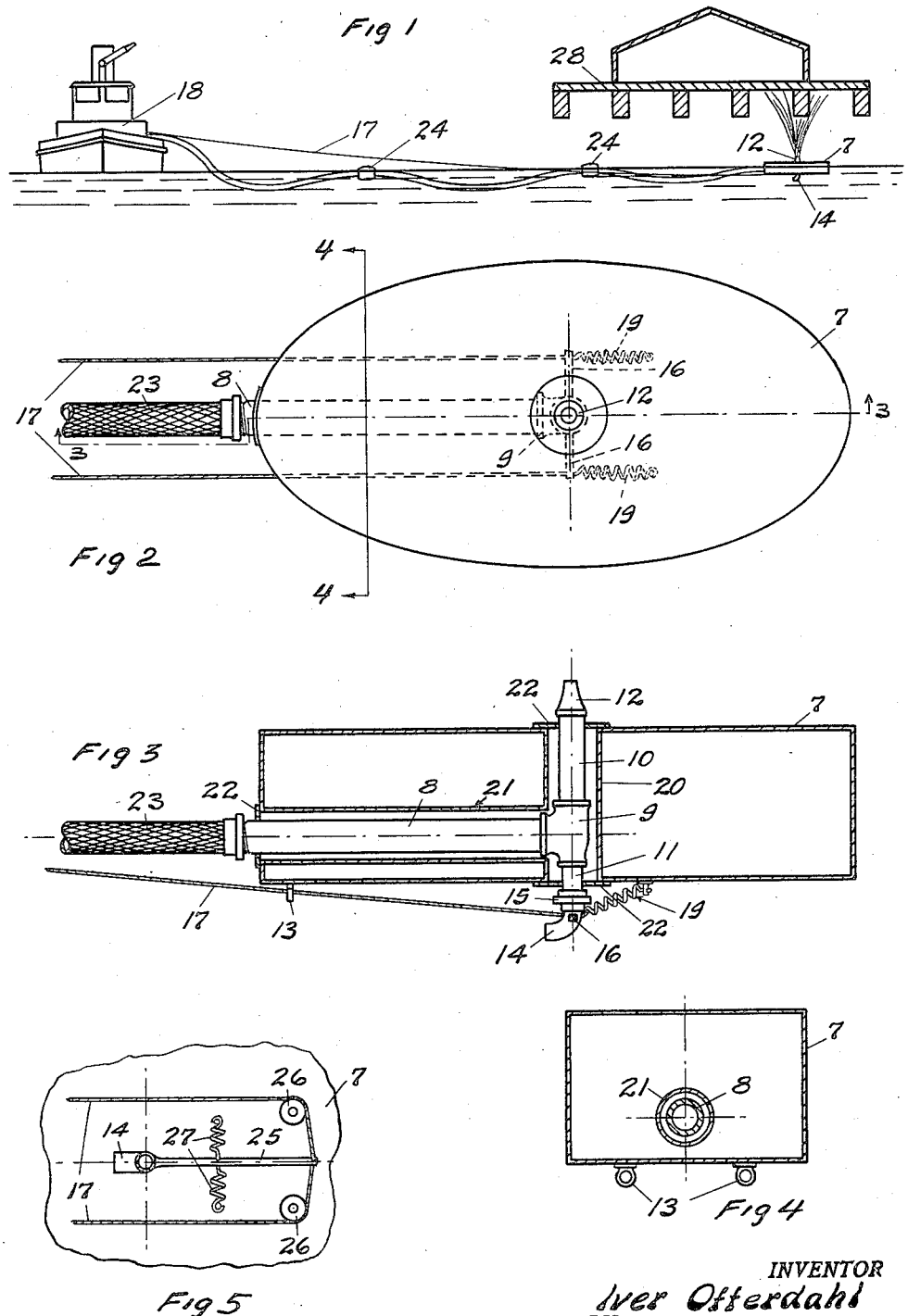
INVENTOR
Iver Offerdahl
BY
Fred C. Matheny
ATTORNEY Patented Dec. 3, 1935

2,023,028

UNITED STATES PATENT OFFICE 2,023,028

JET PROPELLED FLOAT FOR FIRE NOZZLES

Iver Offerdahl, Seattle, Wash.

Application March 20, 1933, Serial No. 661,802

6 Claims. (Cl. 169—2)

My invention relates to fire fighting apparatus for use under structures which are built above water and the primary object of my invention is to provide float means for supporting an upwardly directed fire nozzle in close proximity to the surface of a body of water and to provide means operated by the force of water which is supplied to the fire nozzle for propelling the float to any desired location where it is desired to use the fire nozzle.

In fighting fires in structures which are built above bodies of water, as in docks, wharves, bridges and the like, it is often desirable to direct water upwardly underneath the said structures. In some instances where these structures have only a slight clearance above the water it is substantially impossible for firemen to go under the structure with fire hose for the purpose of directing the water where desired and it is always liable to be very dangerous underneath a burning structure of this nature.

Attempts have been made to fight fires in structures above the water by fastening fire nozzles, with fire hose attached thereto, to floats and then pushing the floats under the structures which are on fire, but this method is slow and inefficient because the float can not be quickly moved to a desired location and can not always be maintained at the desired location and because the distance at which a float can be maneuvered in this way is very limited thus often making it impossible to reach the desired location under a burning structure.

In accordance with my invention I provide means for utilizing the pressure of the water which is supplied to the fire nozzle on the float for driving or propelling the float, said driving means being in the nature of a jet tube pivotally mounted on the float and having a discharge opening positioned below the water line and arranged to discharge a jet of water under pressure into the water which surrounds the float whereby the float will be propelled by the reaction of this discharging jet of water, said jet tube having control means connected therewith and extending to a distant point by which the jet tube may be turned on its pivotal mounting to thereby vary the direction of reactance of the discharging jet of water relative to the float and guide the float.

Further objects of this invention are to provide a jet propelled nozzle carrying float of this nature having water operated driving means combined with flexible guiding means which will permit the float to be sent out long distances and maneuvered around obstructions, as piling or pillars, and to provide other float means for supporting a fire hose which is attached to the float that carries the nozzle.

Other and more specific objects will be apparent from the following description taken in connection with the accompanying drawing.

In the drawing Fig. 1 is a somewhat diagrammatic view illustrating my jet propelled nozzle carrying float as it may appear when in use under a dock and controlled from a fire boat, the dock being shown in cross section.

Fig. 2 is a plan view of the float, parts being shown by dotted lines.

Fig. 3 is a longitudinal section substantially on broken line 3—3 of Fig. 2, parts being shown in elevation.

Fig. 4 is a cross section of the float substantially on broken line 4—4 of Fig. 2.

Fig. 5 is a fragmentary view illustrating a modified form of control means for the jet tube of the float.

Like reference numerals designate like parts throughout the several views.

Referring to the drawing, 7 designates a float which is shown to be of hollow water tight metal construction whereby it will have relatively great buoyancy and will be durable and resistant to fire. It will be understood, however, that this float may be made of other buoyant material, as wood, if desired. The float 7 is provided with a substantially horizontal water inlet pipe 8 which may be connected by a fitting 9 with an upwardly extending pipe 10 and with a downwardly extending pipe 11. A nozzle 12, of any suitable form adapted to discharge either a stream or a spray of water, is provided on the upper end of the upwardly extending pipe 10 and a jet tube 14, preferably of elbow shape, is connected by swivel joint mechanism 15 with the lower end of the downwardly extending pipe 11. Two cross arm members 16 are secured to the jet tube 14 and extend sidewise therefrom in transverse directions relative to the float. Two flexible lines or cables 17 are secured to the respective cross arms 16 and extend rearwardly of the float through guides 13 and thence extend to a location from which the float is controlled, as to a fire boat 18.

While the jet tube 14 is preferably of elbow shape and makes a right angle bend so that it will deliver a jet of water horizontally it will be understood that the shape of this jet tube may be varied and that said jet tube may be operative to propel the float as long as the jet of water is delivered in a non-vertical direction whereby it will have a horizontal component of reaction.

Two balanced springs 19 may be connected with the cross arms 16 and may exert a yielding tension thereon tending to keep the jet tube 14 pointed straight to the rear whereby the reactance of water discharging from the jet tube 14 will tend to move the float straight ahead in the absence of guiding or deflecting influences.

In the float shown in the drawing I have provided in the body of the float a vertical tubular passageway 20 for the vertical pipes 10 and 11 and fitting 9 and have further provided an intersecting horizontal tubular passageway 21 for the horizontal water inlet pipe 8. Plates 22 are preferably provided at the ends of these passageways 20 and 21. These plates 22 may, if desired, be welded to the float and to the pipes 8, 10 and 11, which extend outwardly through the said plates. The tubular passageways 20 and 21 strengthen and brace the float 7 and will prevent water from filling the interior of the float in the event of leakage around the water pipes 8, 10 or 11 but said passageways are not essential, and the manner of connecting the pipes 8, 10 and 11 with the float may be varied.

A hose 33 is connected with the rear end of the horizontal water inlet pipe 8 and extends to the fire boat 18 or to any other source of supply of water under pressure, it being understood that this float may be used independently of a fire boat. Smaller floats 24 are preferably connected with the hose 23 at intervals to support the hose near the surface of the water and prevent it from sinking to the bottom. These floats 24 preferably support the hose 23 beneath the surface of the water whereby it will be less liable to be damaged by fire. The hose 23 may also serve as a haul back means by which the float 6 may be hauled back to the fire boat 18.

Fig. 5 shows a modified form of control means for the jet tube 11. In this form of control a single lever arm 25 is secured to the jet tube 11 and may extend forwardly therefrom and the guide lines 17 are passed around sheaves 26 and secured to this lever arm 25 in such a manner that the jet tube may be turned or guided by pulling on the guide lines. Springs 27 tend to hold the lever arm 25 in alignment with the longitudinal axis of the float.

In the use of this jet-propelled nozzle-supporting float the float is placed in the water with the hose 23 connected thereto and is headed in the desired direction. Water under pressure is admitted to the hose 25. A portion of this water will be discharged at high velocity from the jet tube 11 thus producing a reactance which tends to drive the float in the direction in which it is headed. As the hose 25 and guide lines 17 are fed out they will be dragged behind the float 6. The float can be stopped at any time by holding the hose 25 and said float can be guided by exerting a pull on the guide line in the direction toward which it is desired to have the float move. In this way, I find that the float can be quickly and easily moved outwardly and successfully maneuvered to almost any desired location within distances up to one thousand feet from the point at which the operator is stationed. This is a great advantage over nozzle-supporting floats which do not have propelling and guiding means on the float and which can only be maneuvered at a short distance from the operator. This relatively great range of distance which I obtain by the use of my jet propelling and my float guiding means makes it practical to use my float in fighting fires which could not be reached by floats operating at shorter distances.

The reaction due to the discharge of water upwardly from the nozzle 12 will be downward and substantially vertical and will be borne by the float without any substantial tendency to tilt or deflect the float. By exerting a series of sharp quick pulls first on one guide line 17 and then on the other and thus swinging the jet tube first to one side and then to the other it is possible to impart a rocking movement to float and thus spread the water which is discharged from the nozzle 12. The jet tube 14 may be substantially smaller than the nozzle so that the major portion of the water supplied by the hose 23 will discharge upwardly through the nozzle.

This float and nozzle only extend a short distance above the water level and will go under a dock 29 or similar structure which is too close to the water to permit firemen in a boat to work thereunder, thus making it possible to successfully and efficiently fight fires which can not be reached by ordinary fire fighting equipment. This results in an economic saving and also reduces the danger to which the firemen are subjected. This float may be instantly ready for use and may be sent under any structure to a desired location very quickly and it may be maneuvered at will among piling and pillars and other obstructions thus making it a very efficient piece of fire fighting apparatus.

The foregoing description and accompanying drawing clearly disclose a preferred embodiment of my invention but it will be understood that this disclosure is merely illustrative and that such changes in the invention may be made as are fairly within the scope and spirit of the following claims.

I claim:

1. In fire fighting apparatus of the class described, a relatively small low float adapted to be readily maneuvered among piling and underneath structures of low clearance above the water, a flexible water supply conduit extending to a remote source of supply of water under pressure and having one end connected with said float and having its other end connected to means provided with an outlet opening directed upwardly from the float, adjustable jet delivery float propelling means connected with said conduit and positioned to discharge a jet of water in a non-vertical direction below the level of the water which supports the float and guide means controlled from a location remote from the float and operatively associated with the jet means whereby said float may be guided.

2. In fire fighting apparatus of the class described, a relatively small low float adapted to be readily maneuvered among piling and underneath structures of low clearance above the water, a flexible water supply conduit extending to a remote source of supply of water under pressure and having one end connected with said float and having its other end connected to means provided with an outlet opening directed upwardly from the float, adjustable jet delivery float propelling means connected with said conduit and positioned to discharge a jet of water in a non-vertical direction below the level of the water which supports the float and flexible guide lines connected to said jet means and extending to a point remote from the float.

3. In apparatus of the class described, a relatively small low float adapted to be readily maneuvered among piling and underneath structures of low clearance above the water, a flexible water supply conduit extending to a remote source of supply of water under pressure and having one end connected with said float and having its other end connected to means provided with an outlet opening directed upwardly from the float, adjustable jet delivery float propelling means connected with said conduit and positioned to discharge a jet of water in a non-vertical direction below the level of the liquid which supports the float, and flexible position adjusting means connected with said jet delivery means operable from a location remote from the float.

4. In jet propelled fire fighting apparatus of the class described, a relatively small low float adapted to be readily maneuvered among piling and underneath structures of low clearance above the water, an upwardly directed water discharge nozzle supported by said float, a flexible water supply hose having one end connected with said float and communicating with said nozzle and the other end connected with a remote source of supply of water under pressure, a jet tube communicating with said hose and pivotally supported from the float for swinging movement on a substantially vertical axis and positioned to discharge a jet of water in a non-vertical direction below the level of the liquid which supports the float and flexible control means connected with said jet tube and extending to a point remote from said float whereby the angular position of the jet tube relative to the float may be varied.

5. In jet propelled fire fighting apparatus of the class described, a relatively small low float adapted to be readily maneuvered among piling and underneath structures of low clearance above the water, an upwardly directed water discharge nozzle supported by said float, a flexible water supply hose having one end connected with said float and communicating with said nozzle and the other end connected with a remote source of supply of water under pressure, an elbow shaped jet tube extending below the float and positioned to discharge a jet of water in a substantially horizontal direction, conduit means communicatively connecting said jet tube with said hose, a swivel joint mounting said jet tube on said conduit means for turning movement on a substantially vertical axis, lever arm means connected with said jet tube, and flexible guide lines connected with said lever arm means.

6. In jet propelled fire fighting apparatus of the class described, a relatively small low float adapted to be readily maneuvered among piling and underneath structures of low clearance above the water, an upwardly directed water discharge nozzle supported by said float, a flexible water supply hose having one end connected with said float and communicating with said nozzle and the other end connected with a remote source of supply of water under pressure, an elbow shaped jet tube extending below the float and positioned to discharge a jet of water in a substantially horizontal direction, conduit means communicatively connecting said jet tube with said hose, a swivel joint mounting said jet tube on said conduit means for turning movement on a substantially vertical axis, lever arm means connected with said jet tube, flexible guide lines connected with said lever arm means and extending to a distant point and resilient positioning means connected with said jet tube whereby said jet tube will always be maintained in the same position when no tension is exerted on said guide lines.

IVER OFFERDAHL.